(12) United States Patent
Lucky et al.

(10) Patent No.: US 10,445,259 B2
(45) Date of Patent: Oct. 15, 2019

(54) BIT REORDERING FOR MEMORY DEVICES (71) Applicant: Western Digital Technologies, Inc., San Jose, CA (US)

(72) Inventors: Richard S. Lucky, Louisville, CO (US); Robert W. Ellis, Phoenix, AZ (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 288 days.

(21) Appl. No.: 15/490,724

(22) Filed: Apr. 18, 2017

(65) Prior Publication Data

US 2018/0300266 A1 Oct. 18, 2018

(51) Int. Cl.
G06F 13/16 (2006.01)
G06F 13/40 (2006.01)

(52) U.S. Cl.
CPC ...... G06F 13/1626 (2013.01); G06F 13/4063 (2013.01)

(58) Field of Classification Search
CPC .......................... G06F 13/1626; G06F 13/4063
See application file for complete search history.

(56) References Cited

U.S. PATENT DOCUMENTS

| | | | |
|---|---|---|---|
| 2009/0043933 A1* | 2/2009 | Bennett | G06F 13/4243 710/118 |
| 2010/0066531 A1* | 3/2010 | Karr | G06Q 10/00 340/539.1 |
| 2014/0104953 A1* | 4/2014 | Itakura | G11C 16/30 365/185.18 |
| 2015/0262557 A1* | 9/2015 | Fritz | G09G 5/395 345/547 |
| 2016/0110135 A1* | 4/2016 | Wheeler | G11C 7/1012 711/154 |
| 2016/0371211 A1* | 12/2016 | Isachar | G06F 13/4013 |

* cited by examiner

Primary Examiner — Henry Tsai
Assistant Examiner — Christopher Daley
(74) Attorney, Agent, or Firm — Patterson & Sheridan, LLP; Steven H. Versteeg (57) ABSTRACT The present disclosure discloses a memory device including a controller for bit reordering. The controller receives an input bit sequence including a plurality of bits with a first bit order. The controller identifies a physical location of a non-volatile memory element in the memory device and determines a correspondence between the first bit order and a second bit order based on the physical location. The controller generates an output bit sequence including the plurality of bits with the second bit order based on the correspondence.

28 Claims, 6 Drawing Sheets

| DIE ADDRESS | INPUT BIT ORDER | OUTPUT BIT ORDER |
|---|---|---|
| ADDRESS 1 | DQ(0 1 2 3 4 5 6 7) | DQ(7 6 5 4 3 2 1 0) |
| ADDRESS 2 | DQ(0 1 2 3 4 5 6 7) | DQ(0 1 2 3 4 5 6 7) |
| ADDRESS 3 | DQ(0 1 2 3 4 5 6 7) | DQ(3 4 7 5 1 2 0 6) |

BIT REORDERING FOR MEMORY DEVICES

BACKGROUND OF THE DISCLOSURE

Field of the Disclosure

Embodiments of the present disclosure generally relate to bit reordering for memory devices such as solid state drives (SSDs).

Description of the Related Art

Flash memory SSDs have advantages over traditional hard disk drives (HDDs) in that SDDs have a higher throughput, lower read/write latency and lower power consumption. NAND flash memories in particular have a low price and a large capacity compared to other non-volatile memories (NVMs).

In a SSD system, NAND dies are connected to a memory controller, e.g., a NAND controller, via parallel data buses. Each data bus includes multiple bus lines to connect the NAND dies to the NAND controller. Crossing-over of the bus lines may require extra vertical interconnect accesses (VIAs) and board layers, and thus may increase the manufacturing costs of the SSD system. In order to avoid crossing-over of the bus lines, there is a need to reorder the bits transmitted on the data buses between the NAND dies and the NAND controller.

The bit reordering can be performed at the NAND die. One approach for bit reordering is using a swap circuit integrated in each NAND die. The swap circuit can reorder the bits at the bus interface of a NAND die according to a predetermined bit order, e.g., the swap circuit can reorder the most significant bit (MSB) as the least significant bit (LSB). However, the swap circuit integrated in each NAND die cannot reorder the bits in any arbitrary bit order.

Therefore, there is a need to arbitrarily reorder the bits transmitted on the data buses between the NAND dies and the NAND controller.

SUMMARY OF THE DISCLOSURE

One embodiment of the present disclosure discloses a memory device. The memory device comprises a plurality of non-volatile memory elements configured to process a plurality of read and/or write operations and a controller connected to the plurality of non-volatile memory elements via one or more buses, wherein each of the one or more buses is configured to connect at least two of the plurality of non-volatile memory elements to the controller. The controller is configured to: receive an input bit sequence including a plurality of bits with a first bit order, wherein the controller writes the input bit sequence to one of the plurality of non-volatile memory elements; identify a physical location of the non-volatile memory element in the memory device; determine a correspondence between the first bit order and a second bit order based on the physical location; and generate an output bit sequence including the plurality of bits with the second bit order based on the correspondence.

Another embodiment of the present disclosure discloses a memory device. The memory device comprises a plurality of processing means configured to process a plurality of read and/or write operations and a controlling means connected to the plurality of processing means via one or more buses, wherein each of the one or more buses is configured to connect at least two of the plurality of processing means to the controlling means. The controlling means is configured to: receive an input bit sequence including a plurality of bits with a first bit order, wherein the controlling means writes the input bit sequence to one of the plurality of processing means; identify a physical location of the processing means in the memory device; determine a correspondence between the first bit order and a second bit order based on the physical location; and generate an output bit sequence including the plurality of bits with the second bit order based on the correspondence.

Another embodiment of the present disclosure discloses a memory device. The memory device comprises a plurality of non-volatile memory elements configured to process a plurality of read and/or write operations and a controller connected to the plurality of non-volatile memory elements via one or more buses, wherein each of the one or more buses is configured to connect at least two of the plurality of non-volatile memory elements to the controller. The controller is configured to: receive an input bit sequence including a plurality of bits with a first bit order, wherein the controller reads the input bit sequence from one of the plurality of non-volatile memory elements; identify a physical location of the non-volatile memory element in the memory device; determine a correspondence between the first bit order and a second bit order based on the physical location; generate an output bit sequence including the plurality of bits with the second bit order based on the correspondence; and transmit the output bit sequence to a processor in the controller for processing.

Another embodiment of the present disclosure discloses a memory device. The memory device comprises a plurality of processing means configured to process a plurality of read and/or write operations and a controlling means connected to the plurality of processing means via one or more buses, wherein each of the one or more buses is configured to connect at least two of the plurality of processing means to the controlling means. The controlling means is configured to: receive an input bit sequence including a plurality of bits with a first bit order, wherein the controlling means reads the input bit sequence from one of the plurality of processing means; identify a physical location of the processing means in the memory device; determine a correspondence between the first bit order and a second bit order based on the physical location; generate an output bit sequence including the plurality of bits with the second bit order based on the correspondence; and transmit the output bit sequence to a processor in the controlling means for processing.

Another embodiment of the present disclosure discloses a method. The method comprises, receiving, by a controller in a memory device, an input bit sequence including a plurality of bits with a first bit order, wherein the controller writes the input bit sequence to one of a plurality of non-volatile memory elements in the memory device; identifying a physical location of the non-volatile memory element in the memory device; determining a correspondence between the first bit order and a second bit order based on the physical location; and generating an output bit sequence including the plurality of bits with the second bit order based on the correspondence.

Another embodiment of the present disclosure discloses a method. The method comprises, receiving, by a controller in a memory device, an input bit sequence including a plurality of bits with a first bit order, wherein the controller reads the input bit sequence from one of a plurality of non-volatile memory elements in the memory device; identifying a physical location of the non-volatile memory element in the memory device; determining a correspondence between the first bit order and a second bit order based on the physical location; generating an output bit sequence including the plurality of bits with the second bit order based on the correspondence; and transmitting the output bit sequence to a processor in the controller for processing.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s). It is to be understood that while reference will be made to NAND devices, the disclosure is equally applicable to other NVMs and thus should not be limited to NAND devices unless expressly claimed.

Figure 1:
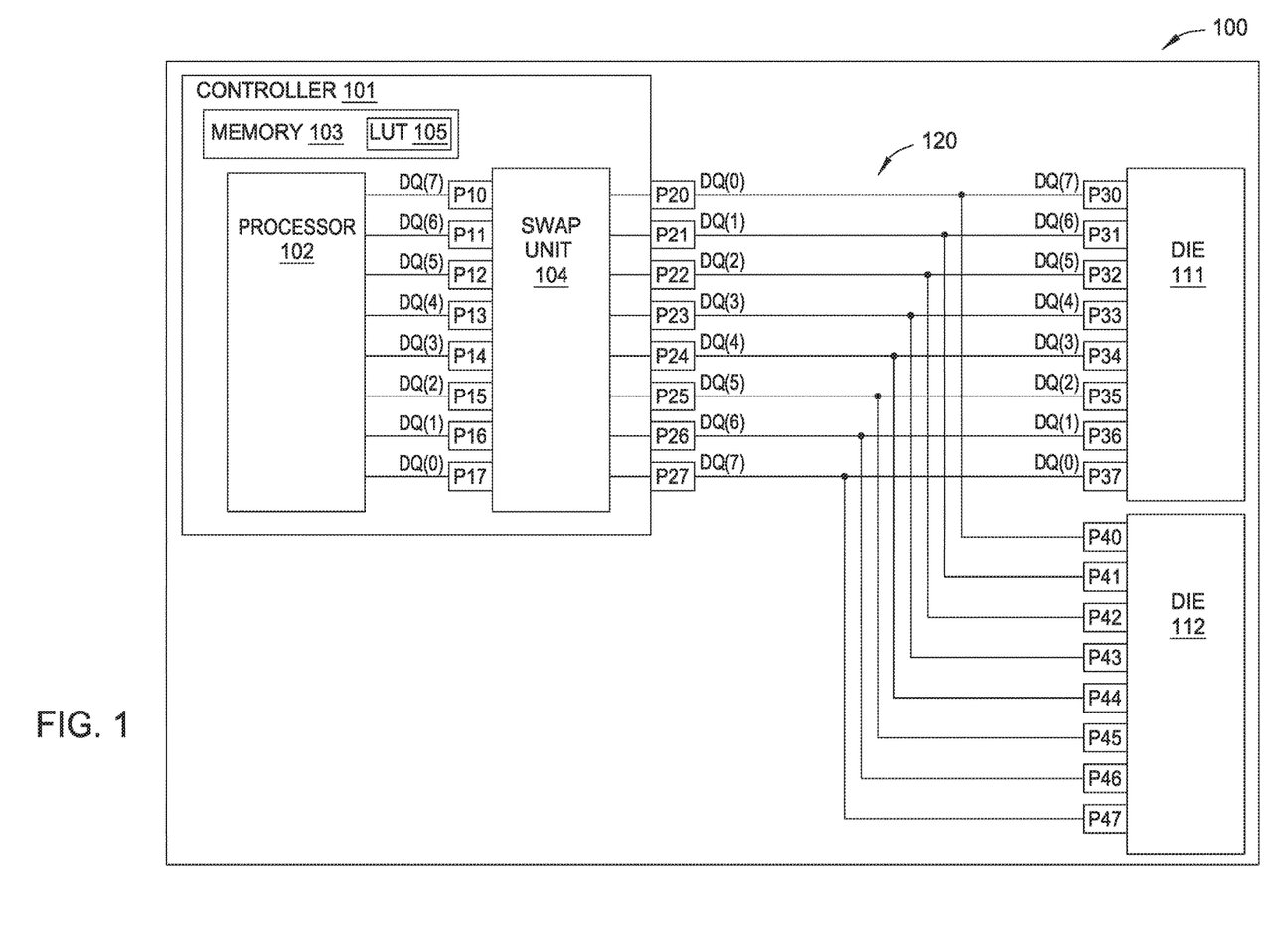
FIG. 1 illustrates a SSD system including a NAND controller, according to one embodiment herein.

FIG. 1 illustrates a SSD system 100 according to one embodiment herein. As shown in FIG. 1, the SSD system 100 includes a controller 101 and multiple dies, e.g., two dies 111 and 112. In one embodiment, the controller 101 is a NAND controller and the dies 111 and 112 are NAND dies. The dies 111 and 112 are connected to the controller 101 via a shared data bus 120. That is, the die 111 and the die 112 communicate data with the controller 101 via the bus 120 at different time periods, but not simultaneously. The shared data bus 120 includes 8 bus lines that construct an 8-bit channel between the dies 111, 112 and the controller 101. Thus, in each bus transaction (e.g., one data transmission via the bus 120 in a time period), 8 bits are transmitted on the bus 120 either from a die 111, 112 to the controller 101 or from the controller 101 to a die 111, 112.

The dies 111, 112 communicate 8 bits in each bus transaction with the controller 101 using 8 endpoints, e.g., I/O pads or terminals, at the bus interface of the dies 111, 112. For example, as shown in FIG. 1, the die 111 uses 8 endpoints P30-P37 to communicate 8 bits in each bus transaction with the controller 101 via the bus 120. Similarly, the die 112 uses 8 endpoints P40-P47 to communicate 8 bits in each bus transaction with the controller 101 via the bus 120.

Each of the 8 endpoints used by each die 111, 112 is corresponding to an unique bit significance. For example, as shown in FIG. 1, P30 on die 111 is corresponding to the MSB, as denoted by DQ(7), and P37 on die 111 is corresponding to the LSB, as denoted by DQ(0). P31-P36 are corresponding to bit significances from DQ(6) to DQ(1), respectively. That is, the bit order of P30-P37 is from the MSB to the LSB (from DQ(7) to DQ(0)). Thus, for example, when the die 111 transmits an 8-bit sequence "00100111" (a byte with a value 39 in decimal) using P30-P37 to the controller 101 via the bus 120 (e.g. a read operation), P30 transmits "0", P31 transmits "0", P32 transmits "1", P33 transmits "0", P34 transmits "0", P35 transmits "1", P36 transmits "1", and P37 transmits "1". Similarly, each of P40-P47 also has the respective unique bit significance. In one embodiment, the bit significance for each endpoint on the dies 111, 112 is predetermined or preconfigured by the manufacturer of the dies 111, 112, which is unchangeable after the dies 111, 112 are manufactured.

As shown in FIG. 1, the controller 101 also uses 8 endpoints P20-P27 at the bus interface to communicate data with the 8 endpoints on the dies 111, 112. Similarly, each of the 8 endpoints P20-P27 used by the controller 101 is corresponding to a unique bit significance. In one embodiment, the bit significance for each of P20-P27 is predetermined or preconfigured by the manufacturer of the SSD system 100, which is unchangeable after the SSD system is manufactured. In one example, P20 on controller 101 is corresponding to the LSB and P27 on controller 101 is corresponding to the MSB. That is, as shown in FIG. 1, the bit order of P20-P27 is from the LSB to the MSB (from DQ(0) to DQ(7)). In this example, in order to communicate data correctly between the NAND die 111 and the controller 101, one approach is to connect P20 with P37 using a bus line of the bus 120 because P20 and P37 are both corresponding to the LSB and connect P27 with P30 using another bus line of the bus 120 because P27 and P30 are both corresponding to the MSB. However, the aforementioned approach causes crossing-over of the bus lines that connect the die 111 to the controller 101, which is not desired.

In one embodiment of the present disclosure, the 8 endpoints on the die 111 or the die 112 can connect to P20-P27 on the controller 101 via the bus 120 in any arbitrary way to avoid or reduce crossing-over of the bus lines. This is achieved by bit reordering performed by the controller 101, which is described in detail below.

As shown in FIG. 1, the controller 101 includes a processor 102, a memory 103 and a swap unit 104. The processor 102 may be any computer processor capable of performing the functions described herein. The memory 103 may include one or more blocks of memory associated with physical addresses, such as random access memory (RAM). The swap unit 104 reorders the 8 bits transmitted on the bus 120 between the die 111, 112 and the controller 101.

As shown in FIG. 1, in one embodiment, to avoid crossing-over of the bus lines, P30 is connected to P20, P31 is connected to P21, P32 is connected to P22, P33 is connected to P23, P34 is connected to P24, P35 is connected to P25, P36 is connected to P26 and P37 is connected to P27. In this way, there is no crossing-over of the bus lines that connect the die 111 to the controller 101. As shown in FIG. 1, three are only straight bus line connections between the die 111 and the controller 101. Similarly as shown in FIG. 1, there is no crossing-over of the bus lines that connect the die 112 to the controller 101.

However, with the bus line connections as shown in FIG. 1, the 8 bits received at P20-P27 are not in the correct bit order for the processor 102 to process. For example, when the die 111 transmits an 8-bit sequence "00100111" using P30-P37 to the controller 101 via the bus 120, P20 receives "0", P21 receives "0", P22 receives "1", P23 receives "0", P24 receives "0", P25 receives "1", P26 receives "1", and P27 receives "1". Because the bit order of P20-P27 is from DQ(0) to DQ(7), the controller 101 receives an 8-bit sequence "11100100" at P20-P27. Thus, if the processor 102 directly processes the 8-bit sequence received at P20-P27, the processor 102 will process "11100100" (from P27-P20) while the die 111 actually transmits "00100111" (from P30-P37) to the controller 101, which causes errors.

In one embodiment, the swap unit 104 reorders the 8-bit sequence received at P20-P27 with the correct bit order for the processor 102 to process. In one embodiment, the correct bit order is the same as the bit order of the die 111, 112, e.g., the bit order of P30-P37 for die 111. The processor 102 checks a look-up table (LUT) 105 in the memory 103 for the bit order of P30-P37. In one embodiment, the LUT 105 stores a mapping or a correspondence between the bit order of P30-P37 and the bit order of P20-P27, based on the die address, i.e., the physical location, of the die 111 in the SSD system 100.

In one embodiment, the processor 102 sends the die address of the die 111 as an input to the LUT 105 and the LUT 105 outputs the bit order of P30-P37 to the swap unit 104. The swap unit 104 reorders the 8-bit sequence received at P20-P27 according to the bit order of P30-P37 provided by the LUT 105. For example, the 8-bit sequence received at P20-P27 is "11100100" according to the bit order of P20-P27, the swap unit 104 reorders "11100100" to generate "00100111" according to the correct bit order, i.e., the bit order of P30-P37 provided by the LUT 105. For example, the LSB bit "0" received at P20 is reordered as the MSB (DQ(7)) and the MSB bit "1" received at P27 is reordered as the LSB (DQ(0)). In this way, after the reordering, "11100100" is reordered as "00100111".

As shown in FIG. 1, after generating the reordered 8-bit sequence, the swap unit 105 uses 8 endpoints P10-P17 to send the reordered 8-bit sequence to the processor 102. In one embodiment, the bit order of P10-P17 is predetermined, e.g., from DQ(7) to DQ(0) as shown in FIG. 1. Thus, the swap unit 105 sends "00100111" from P10-P17 to the processor 102.

FIG. 1 shows only one embodiment. In other embodiments, the bit order of P10-P17 can be from DQ(0) to DQ(7), the bit order of P20-P27 can be from DQ(7) to DQ(0), and the bit order of P30-P37 can be from DQ(0) to DQ(7). In another embodiment, the die 112 transmits an 8-bit sequence from P40-P47 to P20-P27 via the bus 120.

The swap unit 104 reorders the 8-bit sequence received at P20-P27 similarly as described above. The bit order of P40-P47 can be the same or different from the bit order of P30-P37. In another embodiment, the 8 endpoints of die 111 or die 112 can connect to P20-P27 on the controller 101 in arbitrary ways to avoid or reduce crossing-over of the bus lines.

The embodiments above describe the bit reordering for a read operation, e.g. the 8-bit sequence is transmitted from the die 111 to the controller 101. In another embodiment, the 8-bit sequence is transmitted from the controller 101 to a die 111, 112, e.g., the die 111, for a write operation. In this embodiment, the 8-bit sequence is transmitted from the processor 102 to P10-P17, the swap unit 104 reorders the 8-bit sequence received at P10-P17 with the correct bit order and uses P20-P27 to transmit the reordered 8-bit sequence to P30-P37, as described in detail below.

Figure 2:
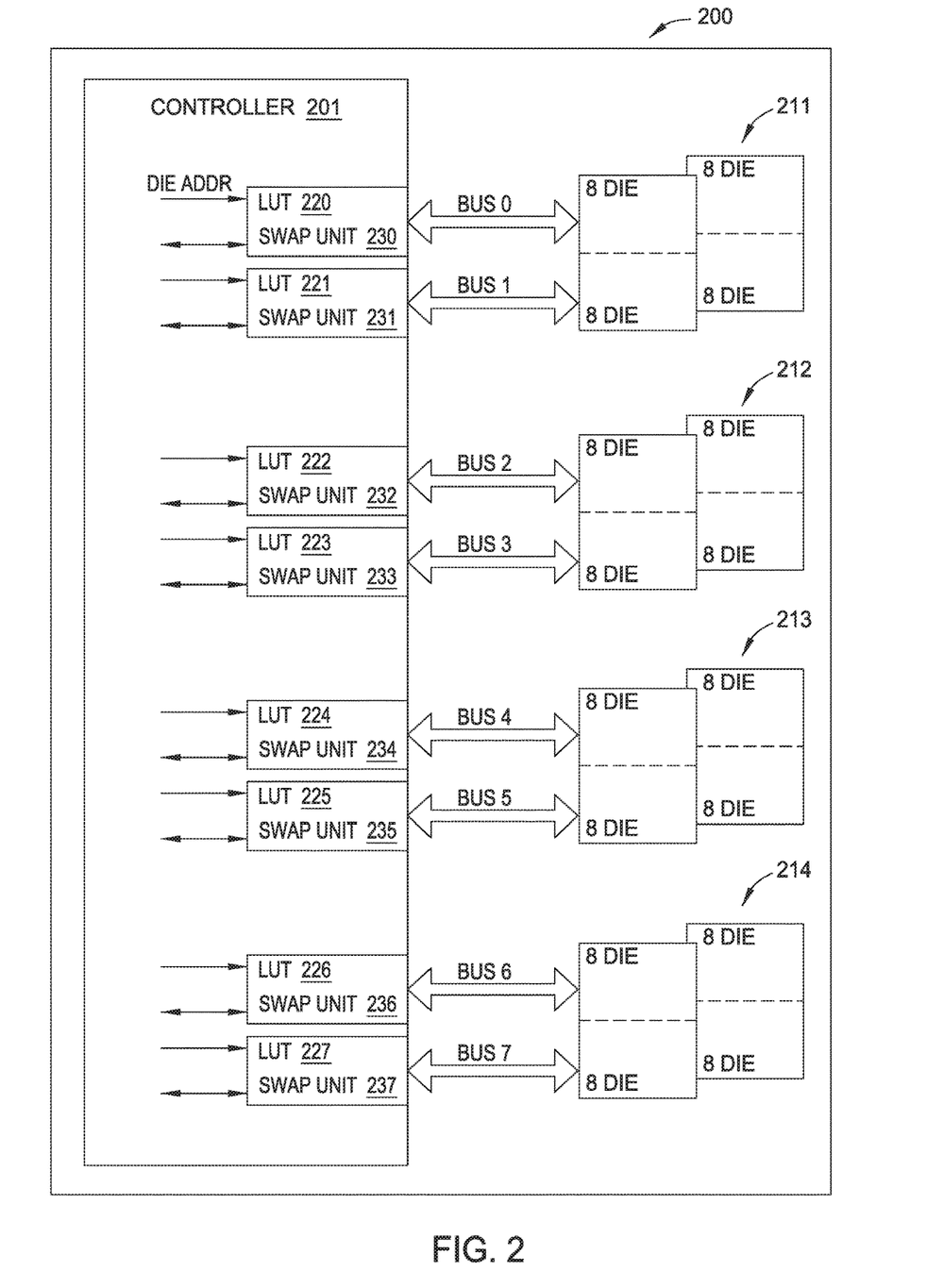
FIG. 2 illustrates a SSD system including a NAND controller, according to another embodiment herein.

FIG. 2 illustrates a SSD system 200 according to one embodiment herein. The SSD system 200 includes a controller 201. The controller 201 is connected to 128 dies via 8 buses, i.e. from BUS0 to BUS7, as shown in FIG. 2. In one embodiment, each of the 8 buses constructs an 8-bit channel, as described above. That is, each bus in FIG. 2 includes 8 bus lines.

In one embodiment, the 128 dies are packaged in four ball grid array (BGA) packages denoted as 211, 212, 213 and 214 in FIG. 2. Each BGA package includes 32 dies that are connected to the controller 201 via 2 buses. For example, the 32 dies in BGA package 211 are connected to the controller 201 via BUS0 and BUS1. In one embodiment, 16 dies in each BGA package share the same bus. For example, the 16 dies in the upper part of the BGA package 211 share BUS0 and the 16 dies in the lower part of the BGA package 211 share BUS1. In one embodiment, each of the 128 dies uses its respective 8 endpoints to connect to the controller 201 via the corresponding shared bus, similarly as P30-P37 and P40-P47 described in FIG. 1. The endpoints on each die are not shown in FIG. 2 for simplicity of illustration.

In one embodiment, for each bus, the controller 201 uses 8 endpoints to connect to the respective 8 endpoints on each of the 16 dies sharing the bus, similarly as P20-P27 described in FIG. 1. Thus, in one embodiment, the controller 201 has totally 64 endpoints for the 8 buses. The endpoints on the controller 201 are not shown in FIG. 2 for simplicity of illustration.

In one embodiment, for each bus, the controller 201 includes a respective LUT 220-227 and a respective swap unit 230-237. For example, for BUS0, the controller 201 includes LUT 220 stored in a memory of the SSD system 200 and swap unit 230. The memory of the SSD system 200 is not shown in FIG. 2 for simplicity of illustration. By using the LUT and the swap unit for each bus, each of the 16 dies sharing the bus can connect to the controller 201 in any arbitrary way to avoid or reduce crossing-over of the bus lines that connect the die to the controller 201.

In one embodiment, when one of the 16 dies transmits an 8-bit sequence to the controller 201 via the shared bus for a read operation, the controller 201 reorders the received 8-bit sequence by using the respective LUT and the swap unit, similarly as described above in FIG. 1. For example, when one of the 16 dies sharing BUS0 transmits an 8-bit sequence to the controller 201 via an arbitrary bus line connection. The processor in the SSD system 200 (not shown in FIG. 2) sends the die address of the die as an input to the LUT 220 and the LUT 220 outputs the correct bit order of the die to the swap unit 230. The swap unit 230 reorders the received 8-bit sequence to generate the 8-bit sequence with the correct bit order and sends the reordered 8-bit sequence to the processor.

In another embodiment, when the controller 201 transmits an 8-bit sequence to one of the 16 dies via the shared bus for a write operation, the controller 201 reorders the transmitted 8-bit sequence by using the respective LUT and the swap unit to generate the 8-bit sequence with the correct bit order and sends the reordered 8-bit sequence to the die.

FIG. 2 shows only one embodiment. In other embodiments, the controller 201 can connect to a different number of dies via a different number of buses. In other embodiments, each BGA package can include a different number of dies and the dies are wired inside the BGA package. In other embodiments, each bus is shared by a different number of dies.

Figure 3:
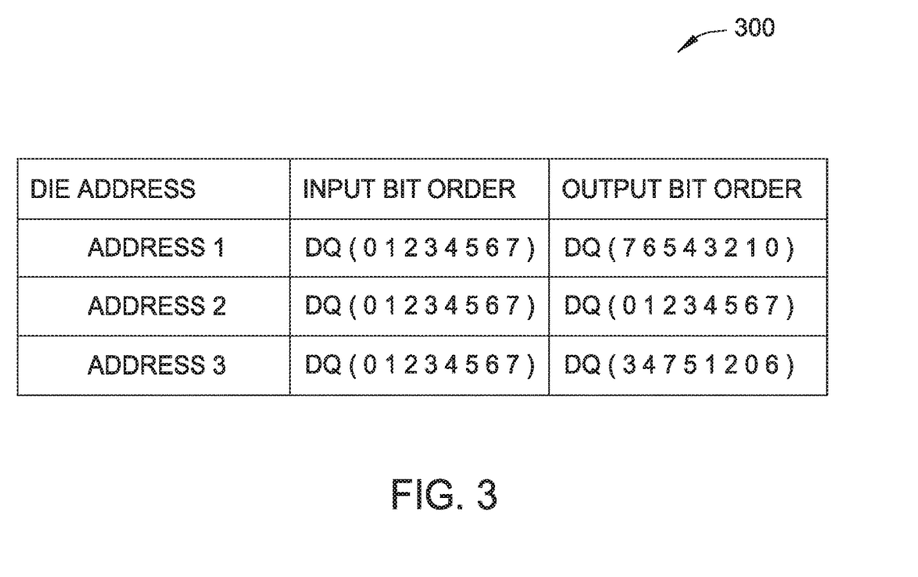
FIG. 3 illustrates a look-up table, according to one embodiment herein.

FIG. 3 illustrates a LUT 300, according to one embodiment herein. In FIG. 3, the LUT 300 is for one bus. For example, it is assumed that the LUT 300 is for the bus 102 in FIG. 1. That is, the LUT 300 is the LUT 105 in FIG. 1. In one embodiment, the LUT 300 stores a correspondence between an input bit order and an output bit order for each of the multiple dies (e.g., the dies 111 and 112) connecting to the controller 101 via bus 102. In one embodiment, the correspondence between an input bit order and an output bit order for a die is determined based on the die address, i.e., the physical location of the die in the SSD system 100. The dies at different physical locations connect to the controller 101 with different bus line connections to avoid or reduce crossing-over of the bus lines. Thus, the dies at different physical locations have different correspondences between the input bit order and the output bit order.

In one embodiment, the LUT 300 stores a correspondence between an input bit order and an output bit order for each of the dies connecting to the controller 101 via bus 102 for read operations. For example, when the die 111 transmits an 8-bit sequence to the controller 101, the processor 102 can identify that the 8-bit sequence is from the die 111 and the die 111 has address 1, e.g., based on the information in the command and/or address phases. The processor 102 sends address 1 to the LUT 300 to retrieve the correspondence for the die 111. As shown in FIG. 3, for address 1, the input bit order is from DQ(0) to DQ(7), denoted as DQ(0 1 2 3 4 5 6 7), and the corresponding output bit order is from DQ(7) to DQ(0), denoted as DQ(7 6 5 4 3 2 1 0). That is, DQ(0) in the input bit sequence is reordered as DQ(7) in the output bit sequence, DQ(1) in the input bit sequence is reordered as DQ(6) in the output bit sequence, DQ(2) in the input bit sequence is reordered as DQ(5) in the output bit sequence, DQ(3) in the input bit sequence is reordered as DQ(4) in the output bit sequence, DQ(4) in the input bit sequence is reordered as DQ(3) in the output bit sequence, DQ(5) in the input bit sequence is reordered as DQ(2) in the output bit sequence, DQ(6) in the input bit sequence is reordered as DQ(1) in the output bit sequence, and DQ(7) in the input bit sequence is reordered as DQ(0) in the output bit sequence. Thus, in one embodiment, the correspondence is a bit-to-bit correspondence between each bit in the input bit sequence and each bit in the output bit sequence.

The LUT 300 provides the correspondence for the die with address 1, i.e. the die 111, to the swap unit 104 to reorder the input bit sequence to generate the correct output bit sequence. For example, the die 111 transmits an 8-bit sequence "00100111" from P30-P37 to the controller 101. The controller 101 receives an 8-bit input sequence "11100100" at P20-P27 from the die 111 (the MSB "1" is received at P27 and the LSB "0" is received at P20). Based on the correspondence for address 1 in LUT 300, the 8-bit output sequence to the processor 102 is "00100111", which is the same as the actually transmitted 8-bit sequence from the die 111. Thus, the swap unit 104 transmits "00100111" to the processor 102 (the MSB "0" is transmitted at P10 and the LSB "1" is transmitted at P17).

In another embodiment, the LUT 300 stores a correspondence between an input bit order and an output bit order for each of the dies connecting to the controller 101 via bus 102 for write operations. For example, when the controller 101 transmits an 8-bit sequence "00100111" from the processor 102 to the die 111, P10-P17 receive the 8-bit input sequence "00100111" (the MSB "0" is received at P10 and the LSB "1" is received at P17). Based on the correspondence for address 1 in LUT 300, the 8-bit output sequence is "11100100". Thus, P20-P27 transmits "11100100" to P30-P37 (the MSB "1" is transmitted at P27 and the LSB "0" is transmitted at P20). Therefore, P30-P37 receive "00100111", which is the same as the actually transmitted 8-bit sequence from the processor 102.

In LUT 300, the address 2 (the address of die 112) has a different correspondence. As shown in FIG. 3, for address 2, the input bit order is from DQ(0) to DQ(7), denoted as DQ(0 1 2 3 4 5 6 7), and the corresponding output bit order is also from DQ(0) to DQ(7), denoted as DQ(0 1 2 3 4 5 6 7). As explained above, the die 112 can connect to the controller 101 using a different bus line connection. Thus, the die 112 has a different correspondence from the die 111.

The correspondence can be an arbitrary correspondence. For example, as shown in FIG. 3, for a die with an address 3, the input bit order can be from DQ(0) to DQ(7), denoted as DQ(0 1 2 3 4 5 6 7), and the corresponding output bit order can be: DQ(3), DQ(4), DQ(7), DQ(5), DQ(1), DQ(2), DQ(0), DQ(6), denoted as DQ(3 4 7 5 1 2 0 6). That is, DQ(0) in the input bit sequence is reordered to be DQ(3) in the output bit sequence and DQ(7) in the input bit sequence is reordered to be DQ(6) in the output bit sequence.

In one embodiment, the LUT 300 is programmed into the memory 103 of the NAND controller 101 when the layout of the SSD system 100 is designed. For example, when designing the layout of SSD system 100, the way of bus line connections (e.g., wiring) for each die to avoid or reduce crossing-over of the bus lines depends on the physical location (the die address) of the die in the SSD system 100. Also, the way of bus line connections for each die determines the correspondence for bit reordering for the die. Thus, when the layout of the SSD system 100 is designed, the die addresses and the correspondences for bit reordering can be determined and stored into the memory 103 of the controller 101 for future use. When memory 103 is initialized, the LUT 300 is ready to use. Therefore, the controller 101 does not need to create the LUT 300 when the NAND controller 101 needs to perform bit reordering.

FIG. 3 shows only one embodiment for either read operations or write operations. In other embodiments, the LUT 300 includes two different sub-tables for read operations and write operations, respectively. In other embodiments, the LUT 300 can include correspondences for more than two dies. For example, the LUT 300 can include 16 correspondences for the 16 dies in BGA 211 connecting to the controller 201 via BUS0, as shown in FIG. 2. That is, the LUT 300 is the LUT 220 in FIG. 2. In other embodiments, the LUT 300 can include any arbitrary correspondence between an input bit order and an output bit order.

Figure 4A:
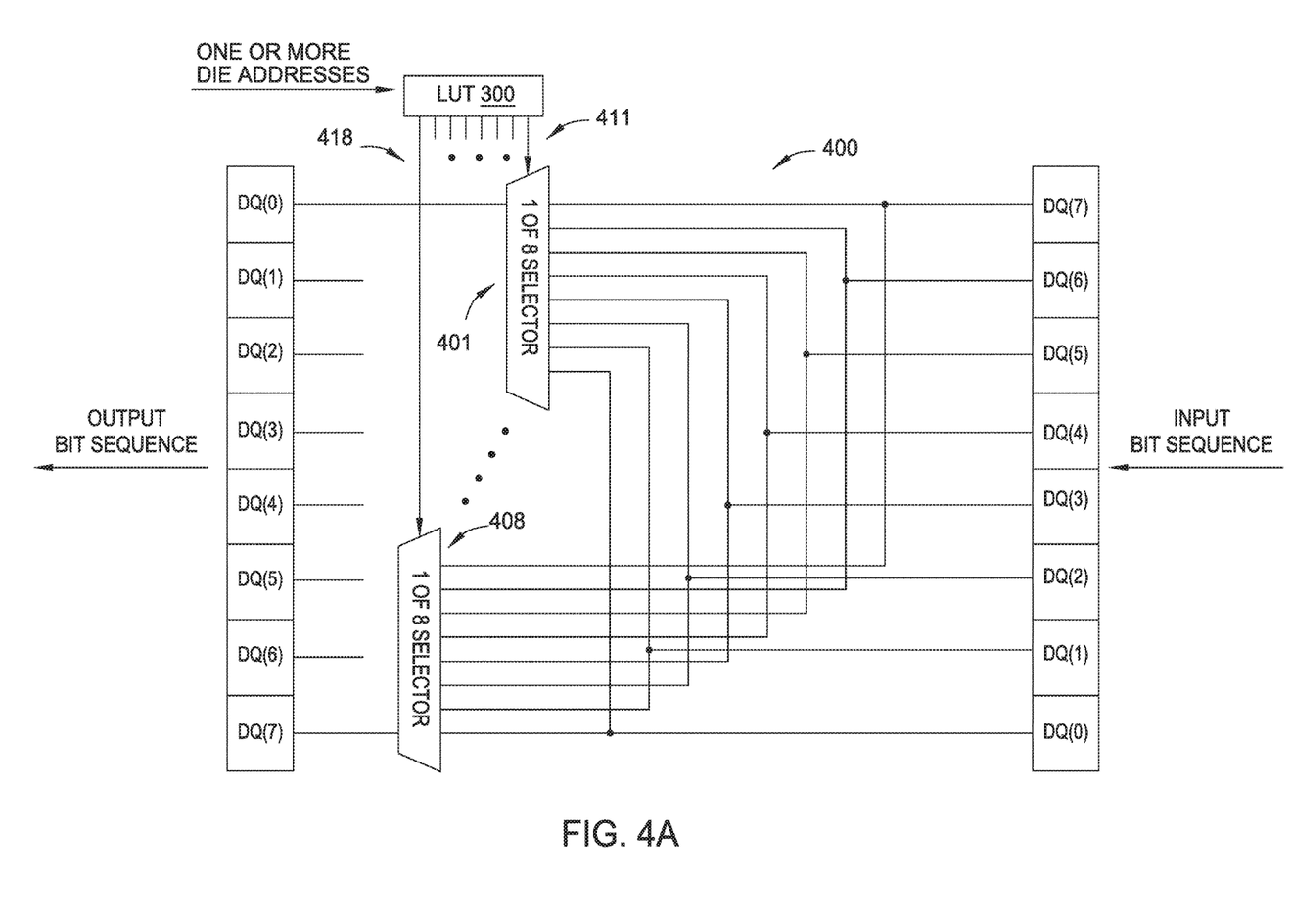
FIG. 4A illustrates a swap circuit, according to one embodiment herein.

FIG. 4A illustrates a swap circuit 400 for read operations, according to one embodiment herein. The swap circuit 400 is included in the swap unit, e.g., the swap unit 104 in FIG.

1 or the swap unit 220 in FIG. 2. The swap circuit 400 includes 8 selectors, e.g., the selector 401 and the selector 408, as shown in FIG. 4A (other 6 selectors are not shown in FIG. 4A for simplicity of illustration). In one embodiment, each of the 8 selectors includes a 1 of 8 selector to generate one output bit. For example, the selector 401 generates the output bit for DQ(0) (i.e., the LSB) in the 8-bit output sequence and the selector 408 generates the output bit for DQ(7) (i.e., the MSB) in the 8-bit output sequence. In one embodiment, the swap circuit 400 reorders the 8-bit input sequence based on one or more die addresses input to the LUT 300.

In one example as described below, it is assumed that the swap circuit 400 is included in the swap unit 104 for read operations between the die 111 and the controller 101, as described in FIG. 1. The 8-bit input sequence is input from the die 111 to each of the 8 selectors in the swap circuit 400 with an bit order from DQ(7) to DQ(0), as shown in FIG. 4A. The 8-bit input sequence is received at P20-P27. The processor 102 can identify that the die 111 has address 1 and sends address 1 to the LUT 300. The LUT 300 provides the respective bit-to-bit correspondence for address 1 to each of the 8 selectors. For example, the LUT 300 provides the respective bit-to-bit correspondence to the selector 401, as indicated by arrow 411. A shown in FIG. 3, for address 1, the input bit DQ(7) in the input 8-bit sequence is corresponding to the output bit DQ(0) in the output 8-bit sequence. Thus, the selector 401 selects the input bit DQ(7) in the 8-bit input sequence as the output bit DQ(0) in the 8-bit output sequence. Similarly, the LUT 300 provides the respective bit-to-bit correspondence to the selector 408, as indicated by arrow 418. The selector 408 selects the input bit DQ(0) in the 8-bit input sequence as the output bit DQ(7) in the 8-bit output sequence. For example, if the 8-bit input sequence received at P20-P27 is "11100100", the selector 401 selects the input bit 1 (DQ(7)) in "11100100" as the output bit DQ(0) in the 8-bit output sequence and the selector 408 selects the input bit 0 (DQ(0)) in "11100100" as the output bit DQ(7) in the 8-bit output sequence. Each of the other 6 selectors generates the respective output bit similarly. Thus, the swap circuit 400 generates the 8-bit output sequence "00100111" and sends the 8-bit output sequence from P10-P17 to the processor 102 for a read operation.

FIG. 4A shows only one embodiment. In other embodiments, based on the bit-to-bit correspondences provided by the LUT 300, each selector in the swap circuit 400 can generate an output bit according to any arbitrary bit-to-bit correspondence between an input bit in the input bit sequence and the output bit in the output bit sequence, as understood by an ordinary person in the art.

Figure 4B:
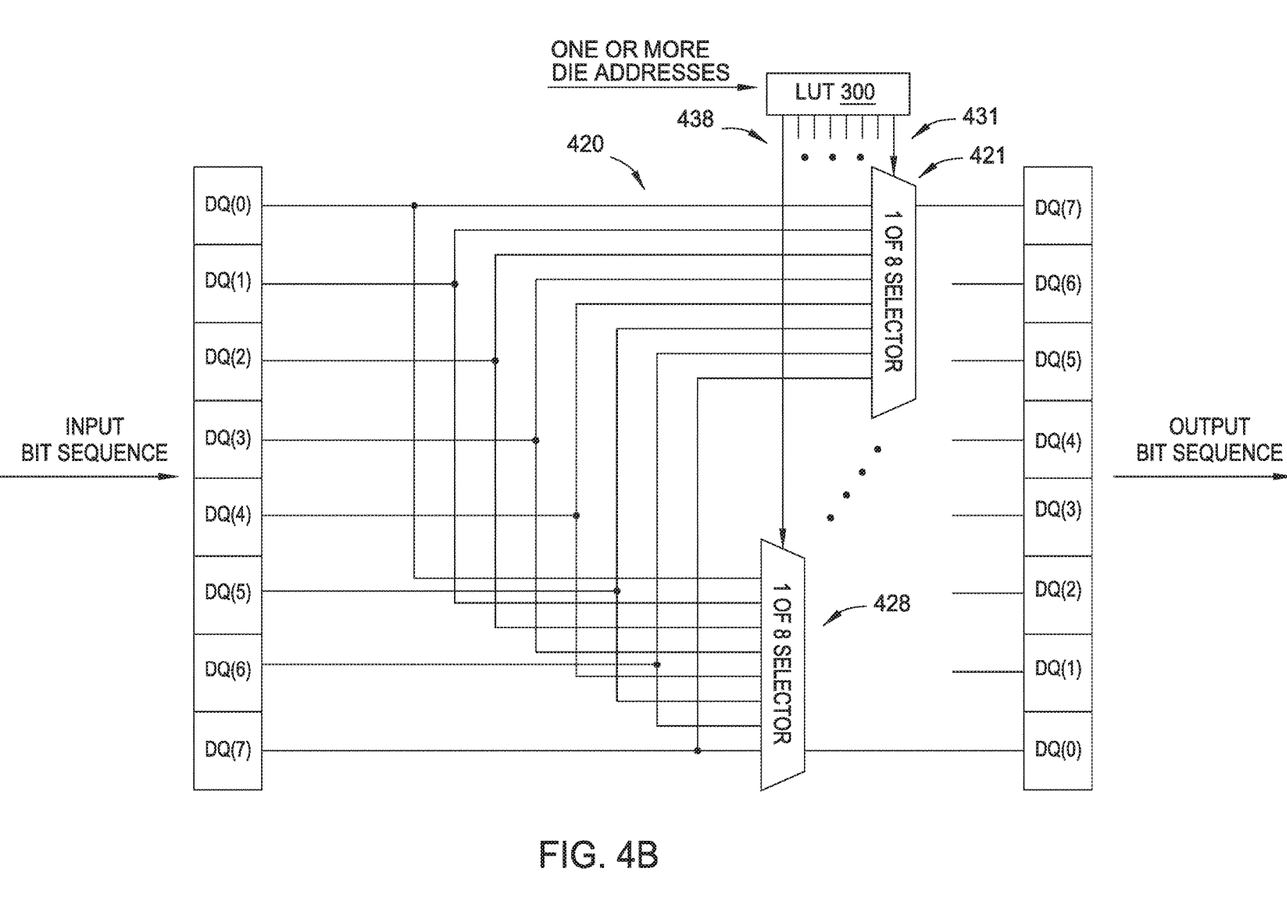
FIG. 4B illustrates a swap circuit, according to another embodiment herein.

FIG. 4B illustrates a swap circuit 420 for write operations, according to one embodiment herein. The swap circuit 420 is also included in the swap unit, e.g., the swap unit 104 in FIG. 1 or the swap unit 220 in FIG. 2. Similarly as in FIG. 4A, the swap circuit 420 includes 8 selectors, e.g., the selector 421 and the selector 428, as shown in FIG. 4B (other 6 selectors are not shown in FIG. 4B for simplicity of illustration). In one embodiment, each of the 8 selectors includes a 1 of 8 selector to generate one output bit. For example, the selector 421 generates the output bit for DQ(7) (i.e., the MSB) in the 8-bit output sequence and the selector 428 generates the output bit for DQ(0) (i.e., the LSB) in the 8-bit output sequence. In one embodiment, the swap circuit 420 reorders the 8-bit input sequence based on one or more die addresses input to the LUT 300.

In one example as described below, it is assumed that the swap circuit 420 is included in the swap unit 104 for write operations between the NAND die 111 and the NAND controller 101, as described in FIG. 1. The 8-bit input sequence is input from the processor 102 to each of the 8 selectors in the swap circuit 420 with an bit order from DQ(0) to DQ(7), as shown in FIG. 4B. The 8-bit input sequence is received at P10-P17. The processor 102 sends address 1 of the NAND die 111 to the LUT 300. The LUT 300 provides the respective bit-to-bit correspondence for address 1 to each of the 8 selectors. For example, the LUT 300 provides the respective bit-to-bit correspondence to the selector 421, as indicated by arrow 431. Based on the bit-to-bit correspondence, the selector 421 selects the input bit DQ(0) in the 8-bit input sequence as the output bit DQ(7) in the 8-bit output sequence. Similarly, the LUT 300 provides the respective bit-to-bit correspondence to the selector 428, as indicated by arrow 438. The selector 428 selects the DQ(7) in the 8-bit input sequence as the output bit DQ(0) in the 8-bit output sequence. For example, if the 8-bit input sequence received at P10-P17 is "01000111", the selector 421 selects the input bit 1 (DQ(0)) in "01000111" as the output bit DQ(7) in the 8-bit output sequence and the selector 428 selects the input bit 0 (DQ(7)) in "01000111" as the output bit DQ(0) in the 8-bit output sequence. Each of the other 6 selectors generates the respective output bit similarly. The swap circuit 420 generates the 8-bit output sequence "11100010" and sends the 8-bit output sequence from P20-P27 to the NAND die 111 for a write operation.

FIG. 4B shows only one embodiment. In other embodiments, based on the bit-to-bit correspondences provided by the LUT 300, each selector in the swap circuit 420 can generate an output bit according to any arbitrary bit-to-bit correspondence between an input bit in the input bit sequence and the output bit in the output bit sequence, as understood by an ordinary person in the art.

In one embodiment, for a read operation, the controller first sends the bits in the command and the address phases to the die and then receives the bits in the data phase from the die. When sending the bits in the command and the address phases to the die, the controller uses the swap circuit 420 to generate the output bit sequence to send to the die. When receiving the bits in the data phase from the die, the controller uses the swap circuit 400 to generate the output bit sequence to send to the processor in the controller. Thus, for a read operation, the controller uses both the swap circuit 400 and the swap circuit 420 in the swap unit. In another embodiment, for a write operation, the controller sends the bits in the command, the address and the data phases to the die by using the swap circuit 420.

Figure 5:
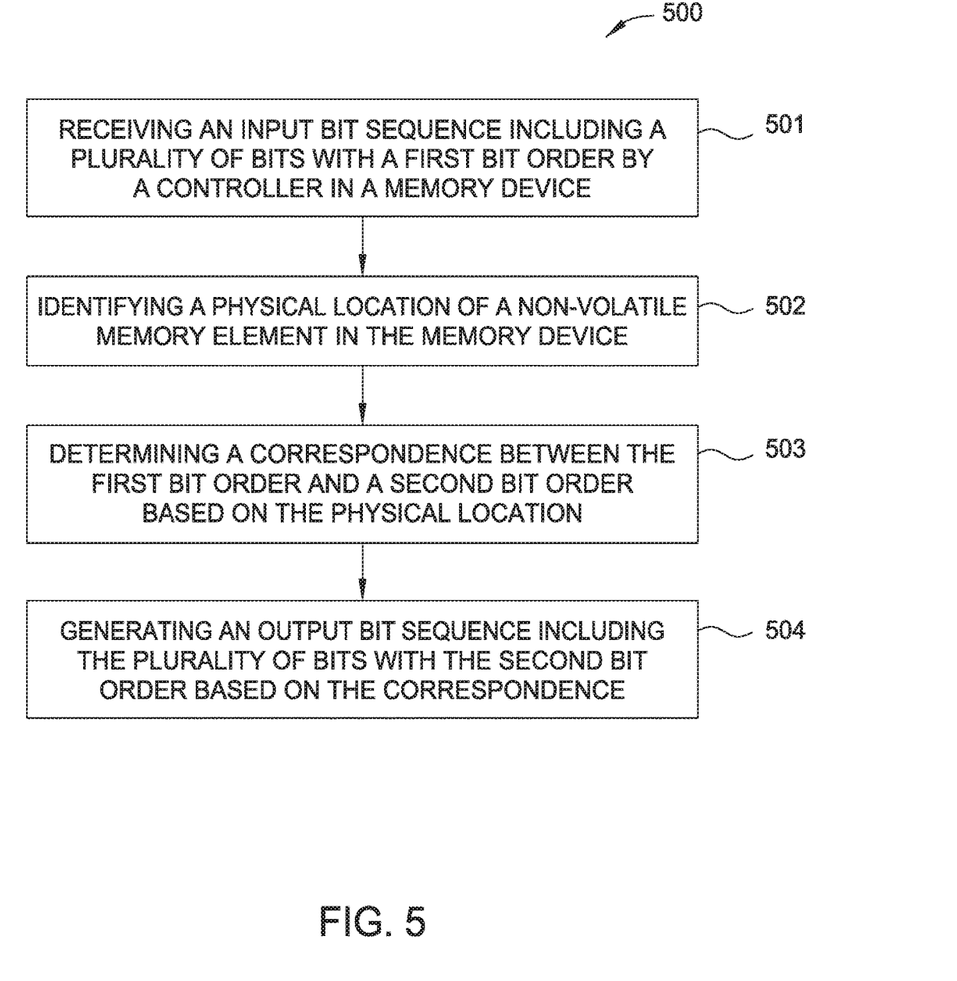
FIG. 5 illustrates a flowchart showing a method for bit reordering, according to one embodiment herein.

FIG. 5 illustrates a flowchart showing a method 500 for bit reordering, according to one embodiment herein. At block 501, the controller in a memory device receives an input bit sequence including a plurality of bits with a first bit order. For example, the controller 101 in the SSD system 100 receives an input bit sequence from the die 111 with a first bit order, e.g., "11100100". At block 502, the controller identifies a physical location of a non-volatile memory element in the memory device. For example, the processor 102 in the controller 101 identifies that the 111 has address 1. At block 503, the controller determines a correspondence between the first bit order and a second bit order based on the physical location. For example, the LUT 105 in the controller 101 determines a correspondence between the first bit order and a second bit order based on address 1 and provides the correspondence to the swap unit 104. At block 504, the controller generates an output bit sequence including the plurality of bits with the second bit order based on the correspondence. For example, the swap unit 104 reorders the input bit sequence based on the correspondence provided by the LUT 105 and generates an output bit sequence with a second bit order, e.g., "00100111". The swap unit 104 sends the generated output bit sequence to the processor 102.

By using the swap unit and the LUT, the controller can arbitrarily reorder the bits transmitted on the data buses between the dies and the controller. Thus, crossing-over of bus lines can be avoided or reduced, which saves the manufacturing costs of the SSD system.

While the foregoing is directed to embodiments of the present disclosure, other and further embodiments of the disclosure may be devised without departing from the basic scope thereof, and the scope thereof is determined by the claims that follow.

What is claimed is:

1. A memory device, comprising:
   a plurality of non-volatile memory elements configured to process a plurality of read and/or write operations; and
   a controller connected to the plurality of non-volatile memory elements via one or more buses, wherein each of the one or more buses is configured to connect at least two of the plurality of non-volatile memory elements to the controller;
   wherein the controller is configured to:
      receive an input bit sequence including a plurality of bits with a first bit order from a first non-volatile memory element of the plurality of non-volatile memory elements, wherein the controller writes the input bit sequence to a first memory device stored in the controller;
      identify a physical location of the first non-volatile memory element in the first memory device stored in the controller;
      determine a correspondence between the first bit order and a second bit order based on the physical location; and
      generate an output bit sequence including the plurality of bits with the second bit order based on the correspondence.

2. The memory device of claim 1, wherein the correspondence between the first bit order and the second bit order indicates a bit-to-bit correspondence between each bit in the input bit sequence and each bit in the output bit sequence.

3. The memory device of claim 1, wherein the controller is further configured to store the correspondence between the first bit order and the second bit order in a look-up table stored in the first memory device stored in the controller.

4. The memory device of claim 1, wherein the input bit sequence is received from the controller and the output bit sequence is transmitted to the non-volatile memory element.

5. A memory device, comprising:
   a plurality of processing means configured to process a plurality of read and/or write operations; and
   a controlling means connected to the plurality of processing means via one or more buses, wherein each of the one or more buses is configured to connect at least two of the plurality of processing means to the controlling means;
   wherein the controlling means is configured to:
      receive an input bit sequence including a plurality of bits with a first bit order from a first processing means of the plurality of processing means, wherein the controlling means writes the input bit sequence to a first memory device stored in the controlling means;
      identify a physical location of the first processing means in the first memory device stored in the controlling means;
      determine a correspondence between the first bit order and a second bit order based on the physical location; and
      generate an output bit sequence including the plurality of bits with the second bit order based on the correspondence.

6. The memory device of claim 5, wherein the memory device comprises a Solid State Drive (SSD).

7. The memory device of claim 5, wherein the correspondence between the first bit order and the second bit order indicates a bit-to-bit correspondence between each bit in the input bit sequence and each bit in the output bit sequence.

8. The memory device of claim 5, wherein the controlling means is further configured to store the correspondence between the first bit order and the second bit order in a look-up table stored in the first memory device stored in the controlling means.

9. The memory device of claim 5, wherein the correspondence between the first bit order and the second bit order comprises an arbitrary correspondence.

10. The memory device of claim 5, wherein the input bit sequence is received from the controlling means and the output bit sequence is transmitted to the processing means.

11. A memory device, comprising:
    a plurality of non-volatile memory elements configured to process a plurality of read and/or write operations; and
    a controller connected to the plurality of non-volatile memory elements via one or more buses, wherein each of the one or more buses is configured to connect at least two of the plurality of non-volatile memory elements to the controller;
    wherein the controller is configured to:
       receive an input bit sequence including a plurality of bits with a first bit order from a first non-volatile memory element of the plurality of non-volatile memory elements, wherein the controller reads the input bit sequence from one of the plurality of non-volatile memory elements;
       identify a physical location of the first non-volatile memory element in a first memory device stored in the controller;
       determine a correspondence between the first bit order and a second bit order based on the physical location;
       generate an output bit sequence including the plurality of bits with the second bit order based on the correspondence; and
       transmit the output bit sequence to a processor in the controller for processing.

12. The memory device of claim 11, wherein the input bit sequence is received from the first non-volatile memory element.

13. The memory device of claim 11, wherein the controller comprises one or more selectors to generate the output bit sequence.

14. The memory device of claim 11, wherein each of the one or more buses constructs an 8-bit channel between the controller and the plurality of non-volatile memory elements.

15. A memory device, comprising:
    a plurality of processing means configured to process a plurality of read and/or write operations; and
    a controlling means connected to the plurality of processing means via one or more buses, wherein each of the one or more buses is configured to connect at least two of the plurality of processing means to the controlling means;

wherein the controlling means is configured to:
receive an input bit sequence including a plurality of bits with a first bit order from a first processing means of the plurality of processing means, wherein the controlling means reads the input bit sequence from one of the plurality of processing means;
identify a physical location of the processing means in a first memory device stored in the controlling means;
determine a correspondence between the first bit order and a second bit order based on the physical location;
generate an output bit sequence including the plurality of bits with the second bit order based on the correspondence; and
transmit the output bit sequence to a processor in the controlling means for processing.

16. The memory device of claim 15, wherein the memory device comprises a Solid State Drive (SSD).

17. The memory device of claim 15, wherein the correspondence between the first bit order and the second bit order indicates a bit-to-bit correspondence between each bit in the input bit sequence and each bit in the output bit sequence.

18. The memory device of claim 15, wherein the controlling means is further configured to store the correspondence between the first bit order and the second bit order in a look-up table stored in the first memory device stored in the controlling means.

19. The memory device of claim 15, wherein the correspondence between the first bit order and the second bit order comprises an arbitrary correspondence.

20. The memory device of claim 15, wherein the input bit sequence is received from the first processing means.

21. A method, comprising:
receiving, by a controller in a memory device, an input bit sequence including a plurality of bits with a first bit order from a first non-volatile memory element of a plurality of non-volatile memory elements, wherein the controller writes the input bit sequence to a first memory device stored in the controller;
identifying a physical location of the first non-volatile memory element in the first memory device stored in the controller;
determining a correspondence between the first bit order and a second bit order based on the physical location; and
generating an output bit sequence including the plurality of bits with the second bit order based on the correspondence.

22. The method of claim 21, wherein the memory device comprises a Solid State Drive (SSD).

23. The method of claim 21, wherein each of the non-volatile memory elements comprises a NAND die.

24. The method of claim 21, wherein the controller comprises a NAND controller.

25. A method, comprising:
receiving, by a controller in a memory device, an input bit sequence including a plurality of bits with a first bit order from a first non-volatile memory element of a plurality of non-volatile memory elements, wherein the controller reads the input bit sequence from one of the plurality of non-volatile memory elements in the memory device;
identifying a physical location of the first non-volatile memory element in a first memory device stored in the controller;
determining a correspondence between the first bit order and a second bit order based on the physical location;
generating an output bit sequence including the plurality of bits with the second bit order based on the correspondence; and
transmitting the output bit sequence to a processor in the controller for processing.

26. The method of claim 25, wherein the correspondence between the first bit order and the second bit order comprises an arbitrary correspondence.

27. The method of claim 25, wherein the plurality of non-volatile memory elements are packaged in one or more ball grid array (BGA) packages.

28. The method of claim 25, wherein the controller is connected to the plurality of non-volatile memory elements via multiple buses.

* * * * *